Figure 1:
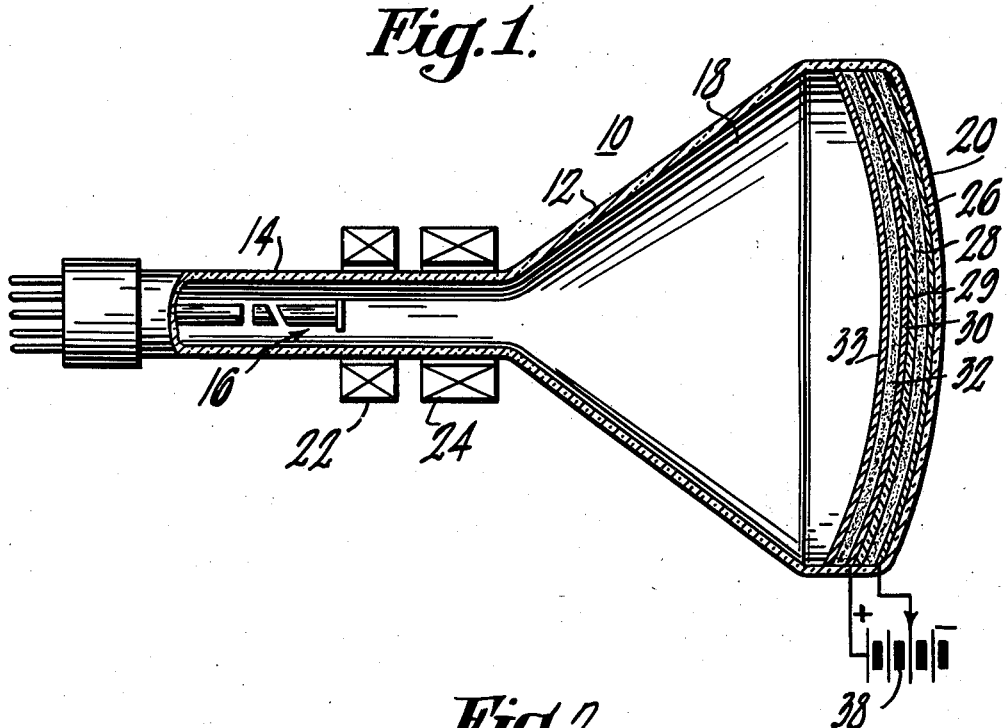

Aug. 4, 1959

S. LARACH 2,898,475

LIGHT INTENSIFIER

Filed Oct. 6, 1955

INVENTOR.
Simon Larach
BY
William A. Zalesak
ATTORNEY

United States Patent Office 2,898,475
Patented Aug. 4, 1959

2,898,475

LIGHT INTENSIFIER

Simon Larach, Princeton, N.J., assignor to Radio Corporation of America, a corporation of Delaware Application October 6, 1955, Serial No. 538,918

8 Claims. (Cl. 250—213)

This invention relates to electroluminescent devices and, particularly, to improved devices of this type for producing intensified or amplified visible images of moving objects.

One type of electroluminescent device employs a layer of electroluminescent material in conjunction with a layer of photoconductive material to provide a visible image. In this type of device an image of a scene is directed onto the photoconductive layer and under proper conditions an intensified visible image of the same scene is produced by the electroluminescent layer. However, under some circumstances, devices of this type are not suitable for providing images of moving scenes.

Accordingly, the objects of this invention are to provide an electroluminescent device of new and improved form suitable for providing intensified images of moving scenes.

The principles of the invention are achieved in apparatus which includes an electroluminescent cell containing a luminescent material which emits visible light when the cell is excited by external radiation such as ultraviolet light and subjected to an electric field. The apparatus also includes a source of this exciting external radiation, the source being stimulated to produce the exciting radiation in response to stimuli from the scene to be reproduced.

A device constructed according to the invention may be embodied in an evacuated envelope of the type used in cathode ray tubes. In such an embodiment, an electroluminescent cell that is sensitive to ultraviolet radiation is provided on the face plate of the tube envelope and a layer of an ultraviolet light-emitting phosphor material, constituting an ultraviolet radiation source is also provided in the tube. This latter phosphor layer is disposed in position to be scanned by an electron beam and to give off ultraviolet light in response to the scanning. The ultraviolet light thus produced is directed onto the electroluminescent cell which, in turn, when subjected to an electric field produces visible light which is more intense than the ultraviolet light. If the electron beam is modulated by a video signal according to techniques employed in television receivers, the output of the phosphor layer scanned by the beam is continuously varied point by point over the surface of the layer to produce an ultraviolet light image of the scene viewed by the television camera, and the output of the electroluminescent cell is the same image but now visible and more intense. The modulated electron beam which scans the source of radiation, such as the ultraviolet light emitting phosphor, constitutes means for continuously varying the output of the source of radiation.

The ultraviolet light-producing portion of the apparatus and the electroluminescent cell may also be supported in spaced apart relationship if desired. In addition, an optical system, for example a system of the typed employed in projection-type television receivers may be employed in the path of travel of the ultraviolet light to the electroluminescent cell.

Figure 2:
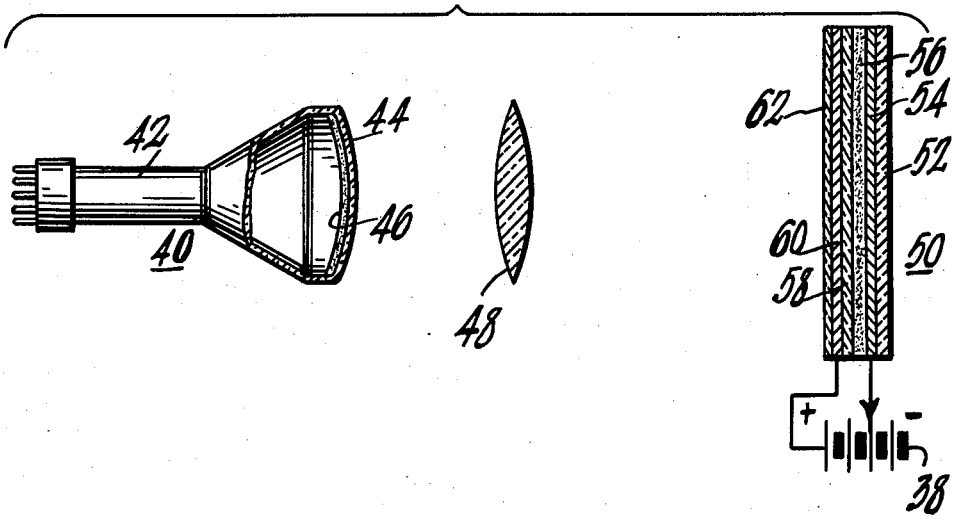

In the drawing:

Fig. 1 is a sectional elevational view of a device embodying the principles of the invention; and Fig. 2 is an elevational view, partly in section, of another embodiment of the invention.

Referring to the drawing, there is shown a cathode ray tube 10 having an envelope 12 which includes a generally tubular neck portion 14 in which an electron gun 16 is mounted and an expanded bulb or shell portion 18 which is closed by a transparent flat or curved face plate 20. The shell and face plate may be formed as a one-piece assembly or they may be separate assemblies which are secured together by welding or by some other suitable process. A focus coil 22 and deflection yoke 24 are provided for controlling an electron beam generated by the electron gun.

According to the invention, an electroluminescent cell is provided within the tube envelope 12 and supported on the inner surface of the face plate. If desired, the electroluminescent cell may be independently supported within the envelope and spaced apart from the face plate. The electroluminescent cell includes a transparent conductive film 26 which may comprise titanium dioxide, tin oxide or a very thin film of gold formed directly on the surface of the face plate by an evaporation process or the like. On the conductive film 26, is deposited a layer 28 of electroluminescent phosphor material which is adapted to emit visible light when excited by external radiation such as ultraviolet light. One suitable electroluminescent material for use in the layer 28 is manganese activated zinc sulfide.

The layer 28 of manganese activated zinc sulfide may be formed using apparatus and method of the type described in a paper by Studer and Cusano "Transparent Phosphor Coatings" in the Journal of the Optical Society of America, July, 1955. In this process, the envelope, or the face plate by itself, is supported in an insulating tube, for example a quartz tube, within a furnace which maintains the temperature of the face plate in the range of 400° C. to 700° C. The quartz tube is provided with three inlet tubes—one for connection to a vacuum pump, one for admission of hydrogen sulfide, and one for introducing the reaction materials. A typical powder mixture of reaction materials for making a screen of ZnS:Mn is as follows:

25 parts by weight zinc
12.5 parts by weight zinc chloride
0.38 part by weight manganese chloride.

An atmosphere of hydrogen sulfide of the order of a few millimeters of mercury is maintained within the insulating tube and the reaction materials are fed gradually into the quartz tube in powder form. In this way, the vapors of the reactant materials which are formed in the heated quartz tube are present throughout the process in substantially the same, constant proportions.

The thickness of the zinc sulfide phosphor layer increases with the amount of powdered reaction materials that are introduced into the quartz tube, provided a given rate of dropping is maintained. As the thickness increases beyond approximately one-half micron, the phosphor layer tends to develop surface roughness. This roughness gives rise to some light scattering which increases with thickness of deposit. However, when the surface is polished with a fine abrasive, transparency is restored in coatings 10 to 20 microns thick or more.

After the electroluminescent layer 28 has been prepared, a protective film 29 of silica may be evaporated thereon, if desired, and, then, a second conductive film 30 is formed by evaporation on the layer of silica. Next, a thin layer 32 of an ultraviolet light-emitting phosphor material, constituting the radiation source, is deposited on the second conductive film 30 in any suitable fashion. Suitable phosphors for this purpose are zirconium phosphate, aluminum oxide, and cerium activated calcium magnesium silicate. The phosphor layer may be formed by a setting process from a liquid suspension. Finally, if desired, a thin, light-reflecting film 33 of electron pervious light material, for example aluminum, is formed on the phosphor layer.

In operation of the tube, a D.C. potential difference of the order of 20 to 100 volts is applied across the electroluminescent cell, for example by means of a battery 38 connected to the conductive films 26 and 30. An electron beam is generated by the electron gun and video signals or the like generated in a television or radar system or the like are used to modulate the electron beam. The modulated electron beam scanning the source of radiations, or phosphor layer 32, constitutes means for continuously varying the output of said source of radiations, for as the modulated electron beam is scanned over the surface of the phosphor layer 32, an ultraviolet light image is emitted by the phosphor layer and excites the electroluminescent layer 28 which in turn produces a visible intensified light image. It has been determined that the degree of light intensification is of the order of ten to one.

The principles of the invention may be embodied in apparatus of the type employed in projection television systems. This type of apparatus, referring to Fig. 2, employs a small cathode ray tube 40 including an envelope 42 having a face plate 44 which may be of the order of five inches in diameter. A layer 46 of ultraviolet light-emitting phosphor material, constituting the radiation source, is provided on the face plate. A suitable optical lens system of any convenient type and complexity, represented by the lens 48, is disposed in front of the cathode ray tube and optically couples the output of the tube to an electroluminescent cell 50. The electroluminescent cell 50 may be of any suitable size and includes a glass support plate 52 on which is evaporated a thin transparent conductive film 54, for example of gold, on which is formed a thin film 56 of electroluminescent material sensitive to ultraviolet light, for example manganese activated zinc sulfide. If desired, a protective insulating film 58 of silica or the like is evaporated on the electroluminescent film 56. A second transparent conductive film 60, for example of gold, is deposited on the silica film 58, and, if desired, a final protective insulating film 62 of silica is evaporated on the transparent conductive film 60.

The cathode ray tube 40 and optical lens system 48 and the electroluminescent cell 50 may be contained in a suitable light-tight housing (not shown).

The apparatus of Fig. 2 operates in essentially the same way as the apparatus of Fig. 1. The electron beam generated in the cathode ray tube 40 is modulated by video signals or the like and is scanned over the phosphor layer 46. The electron beam scanning over the phosphor layer 46 constitutes means for continuously varying the output of the radiation source. An ultraviolet image which emanates from the phosphor layer 46 is focused by the lens system 48 on the electroluminescent cell 50. The electroluminescent cell 50 then converts the ultraviolet light image to a more intense visible image. The visible image is of greater size than the ultraviolet image with the magnification being determined by the nature of the lens system 48 and the size of the electroluminescent cell 50.

The invention thus provides a light intensifier of comparatively simple construction which may be employed to intensify images of moving objects.

What is claimed is:

1. An image producing means comprising an electroluminescent phosphor adapted to produce visible light when simultaneously excited by invisible radiations and when subjected to an electric field, a phosphor material adapted to emit said invisible radiations when excited by an electron beam, means for exciting said phosphor with an electron beam, and said phosphor being positioned so that said invisible radiations land on said electroluminescent phosphor.

2. A cathode ray device comprising an electron gun for producing an electron beam, a phosphor of the type that produces an invisible radiation image when bombarded by an electron image arranged in the path of said electron beam, an electroluminescent phosphor arranged in the path of said invisible radiation image, said electroluminescent phosphor being of the type which produces a visible image when simultaneously excited by said invisible radiation image and by an electric field, and means for applying an electric field to said electroluminescent phosphor.

3. A cathode ray device as in claim 2 wherein said electroluminescent phosphor comprises manganese activated zinc silicate and wherein the invisible radiation producing phosphor is a material selected from the group consisting of zirconium phosphate, aluminum oxide and cesium activated calcium magnesium silicate.

4. An image producing device comprising an electroluminescent material adapted to produce visible radiation when simultaneously excited by ultraviolet light, and subjected to an electric field, a body of cathodoluminescent phosphor material which emits ultraviolet image when excited by an electron beam, said body being positioned to direct its output upon said electroluminescent material, and means to apply said electric field to said electroluminescent material whereby a visible image is produced.

5. An image producing device comprising an electroluminescent material adapted to produce visible radiation when simultaneously excited by ultraviolet light, and subjected to an electric field, a body of cathodoluminescent phosphor material which emits ultraviolet image when excited by an electron beam, said body being positioned adjacent to said electroluminescent material, and means for applying said electric field to said electroluminescent material whereby a visible image is reproduced corresponding to said ultraviolet image.

6. A light producing device comprising an electroluminescent cell including manganese activated zinc sulfide electroluminescent material adapted to produce visible light when simultaneously excited by radiation and subjected to an electric field, a cathode ray tube having a face plate carrying a film of cathodoluminescent ultraviolet light-emitting phosphor material, and an optical lens system interposed between said cathode ray tube and said electroluminescent cell for directing the output of said tube onto said cell.

7. A cathode ray device as in claim 2 further including an optical lens system interposed between the invisible radiation producing phosphor and said electroluminescent phosphor.

8. A combination cathodoluminescent-electroluminescent device comprising a cathodoluminescent phosphor of the type which emits ultraviolet radiations when bombarded by an electron beam, means for bombarding said cathodoluminescent phosphor to produce an ultra-violet radiation image, an electroluminescent phosphor arranged in the path of said ultra-violet image, said electroluminescent phosphor being of the type which produces visible light when simultaneously excited by ultra-violet radiations and by an electric field, and means for applying an electric field across said electroluminescent phosphor for producing a visible image corresponding to said ultra-violet radiation image.

References Cited in the file of this patent

UNITED STATES PATENTS

| | | |
|---|---|---|
| 2,423,830 | Fonda | July 15, 1947 |
| 2,435,436 | Fonda | Feb. 3, 1948 |
| 2,446,764 | Henderson | Aug. 10, 1948 |
| 2,593,925 | Sheldon | Apr. 22, 1952 |
| 2,780,731 | Miller | Feb. 22, 1957 |
| 2,837,661 | Orthuber et al. | June 3, 1958 |

OTHER REFERENCES

Quarterly Report No. 3, Fellowship on Computer Components No. 347, Mellon Institute of Industrial Research, July 17, 1952.